(12) United States Patent
Hoshikawa

(10) Patent No.: US 11,453,100 B2
(45) Date of Patent: Sep. 27, 2022

(54) DRESSING TOOL

(71) Applicant: DISCO CORPORATION, Tokyo (JP)

(72) Inventor: Hirotoshi Hoshikawa, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 118 days.

(21) Appl. No.: 17/038,874

(22) Filed: Sep. 30, 2020

(65) Prior Publication Data

US 2021/0101253 A1 Apr. 8, 2021

(30) Foreign Application Priority Data

Oct. 2, 2019 (JP) .............................. JP2019-182106

(51) Int. Cl.
| | |
|---|---|
| *B24B 53/12* | (2006.01) |
| *G06K 7/10* | (2006.01) |
| *G06K 19/07* | (2006.01) |
| *B24B 7/22* | (2006.01) |

(52) U.S. Cl.
CPC .......... *B24B 53/12* (2013.01); *G06K 7/10366* (2013.01); *G06K 19/0723* (2013.01); *B24B 7/228* (2013.01)

(58) Field of Classification Search
CPC ....... B24B 53/017; B24B 53/12; B24B 7/228; G06K 19/0723; G06K 7/10366
See application file for complete search history.

(56) References Cited

U.S. PATENT DOCUMENTS

| | | | | |
|---|---|---|---|---|
| 2006/0014475 | A1* | 1/2006 | Sekiya | G06K 19/04 451/540 |
| 2007/0273533 | A1* | 11/2007 | Yang | G06K 19/045 |
| 2016/0114450 | A1* | 4/2016 | Layton, Jr. | B24D 5/02 451/127 |
| 2016/0217364 | A1* | 7/2016 | Ronneberger | B23Q 1/0009 |
| 2018/0257195 | A1* | 9/2018 | Hasegawa | B24B 7/228 |
| 2020/0156210 | A1* | 5/2020 | Sullivan | H04B 1/385 |

FOREIGN PATENT DOCUMENTS

| | | |
|---|---|---|
| JP | 2000288881 A | 10/2000 |
| JP | 2009142906 A | 7/2009 |
| JP | 2014113652 A | 6/2014 |

OTHER PUBLICATIONS

Search Report issued in counterpart Singapore patent application No. 10202008693U, dated Apr. 13, 2021.

* cited by examiner

*Primary Examiner* — Omer S Khan

(74) *Attorney, Agent, or Firm* — Greer Burns & Crain, Ltd.

(57) ABSTRACT

A dressing tool, to be used in dressing a plurality of grindstones arrayed in an annular pattern on one surface side of a grinding wheel, includes a dressing section for dressing the plurality of grindstones, a support plate that is located on a side opposite to a front surface side of the dressing section making contact with the plurality of grindstones and that supports a back surface side of the dressing section, and an RFID tag from and in which information concerning the dressing tool is read and written. One of or both the support plate and the dressing section are provided with a recess, and the RFID tag is disposed in the recess and is fixed by a non-conductive material provided in the recess.

3 Claims, 3 Drawing Sheets

DRESSING TOOL

BACKGROUND OF THE INVENTION

Field of the Invention

The present invention relates to a dressing tool used when dressing a grindstone of a grinding wheel.

Description of the Related Art

As a processing method in the case of dividing a wafer formed with a plurality of devices on a front surface side thereof into device chips corresponding to the respective devices, there is, for example, a method of grinding the back surface side of the wafer and thereafter cutting the wafer by a cutting blade. Grinding of the wafer is conducted, for example, using a grinding apparatus. The grinding apparatus includes a spindle to one end side of which a grinding wheel having a grinding stone (grindstone) is mounted, and a holding table for holding the wafer that is disposed directly under the spindle.

In the case of grinding the wafer, for example, in a state in which the holding table holding the wafer and the spindle with the grinding wheel mounted thereto are rotated in the same direction, the grinding wheel is pressed against a work surface of the wafer (see, for example, Japanese Patent Laid-Open No. 2000-288881). The grindstone is formed, for example, by mixing abrasive grains of diamond, cubic boron nitride (cBN), or the like into a binder such as vitrified or resinoid, and sintering the mixture. When the wafer is ground by the grindstone, a multiplicity of abrasive grains projecting from the surface of the grindstone (i.e., grinding surface) act as cutting blades, and the work surface of the wafer is ground off.

The grindstone is also worn as the grinding proceeds, and new abrasive grains sequentially appear to the surface of the grindstone making contact with the work surface of the wafer. By this action (called spontaneous edge sharpening action or the like), lowering in grinding performance due to chipping of the abrasive grains, clogging, dulling or the like is restrained, and good grinding is realized. Incidentally, grindstones before use do not have abrasive grains suitably projecting from the surface of the grindstone, and there is variability in the height of the grinding surfaces of the grindstones. In view of this, before grinding of a wafer, a dressing step is conducted in which the grindstones are dressed by a dressing tool (called dressing board or dresser board), to partially remove the binder covering the abrasive grains and to allow the abrasive grains to suitably project from the surfaces of the grindstones (see, for example, Japanese Patent Laid-Open No. 2009-142906).

As the grindstones, there are two kinds of grindstones, i.e., grindstones for rough grinding that have comparatively large abrasive grains and grindstones for finish grinding that have comparatively small abrasive grains. For a dressing step of grindstones for rough grinding, a dressing tool for rough grinding that has comparatively large abrasive grains is used, and, for a dressing step of grindstones for finish grinding, a dressing tool for finish grinding that has comparatively small abrasive grains is used. In the current dressing step, the operator disposes a dressing tool corresponding to the grindstones (i.e., a dressing tool for rough grinding or finish grinding) at a position directly under the grinding wheel for rough grinding or finish grinding, and thereafter, lowers the grinding wheel, to dress the grindstones.

SUMMARY OF THE INVENTION

In the case of manually performing the dressing work in this way, the operator may erroneously select the dressing tool corresponding to the grindstones. For example, a dressing tool for rough grinding may be disposed directly under the grinding wheel for finish grinding, and the grindstones for finish grinding may be dressed by the dressing tool for rough grinding. The present invention has been made in consideration of such a problem. It is an object of the present invention to provide a dressing tool such that a grinding apparatus can recognize that the dressing tool going to be used is a suitable dressing tool corresponding to the grindstones to be dressed.

In accordance with an aspect of the present invention, there is provided a dressing tool to be used in dressing a plurality of grindstones arrayed in an annular pattern on one surface side of a grinding wheel, the dressing tool including a dressing section for dressing the plurality of grindstones, a support plate that is located on a side opposite to a front surface side of the dressing section making contact with the plurality of grindstones and that supports a back surface side of the dressing section, and a radio frequency identifier (RFID) tag from and in which information concerning the dressing tool is read and written. One of or both the support plate and the dressing section are provided with a recess, and the RFID tag is disposed in the recess and is fixed by a non-conductive material provided in the recess.

The dressing tool according to the described aspect of the present invention has the RFID tag. Information concerning the dressing tool (for example, information concerning the grindstones to be dressed by the dressing tool) is stored in the RFID tag. Therefore, if a grinding apparatus is provided with a reading apparatus (reader) capable of reading the information from the RFID tag, the grinding apparatus can recognize for dressing of which grindstones the dressing tool is suitable.

In addition, if the grinding apparatus is provided with a writing apparatus (writer) capable of writing information into the RFID tag, the grinding apparatus can update the information concerning the dressing tool (for example, information concerning the number of times of use). Therefore, the useful life of the dressing tool (i.e., whether or not the expiration date for use has come) and the like can be grasped accurately, as compared to the case of an RFID tag in which information cannot be written. In addition, since the RFID tag is fixed in the recess provided in one of or both the support plate and the dressing section, peeling off the RFID tag from the recess would not occur during transportation or use, unlike in the case where the RFID tag is adhered to the front surface of the support plate.

The above and other objects, features and advantages of the present invention and the manner of realizing them will become more apparent, and the invention itself will best be understood from a study of the following description and appended claim with reference to the attached drawings showing some preferred embodiments of the invention.

DETAILED DESCRIPTION OF THE PREFERRED EMBODIMENTS

Figure 1:
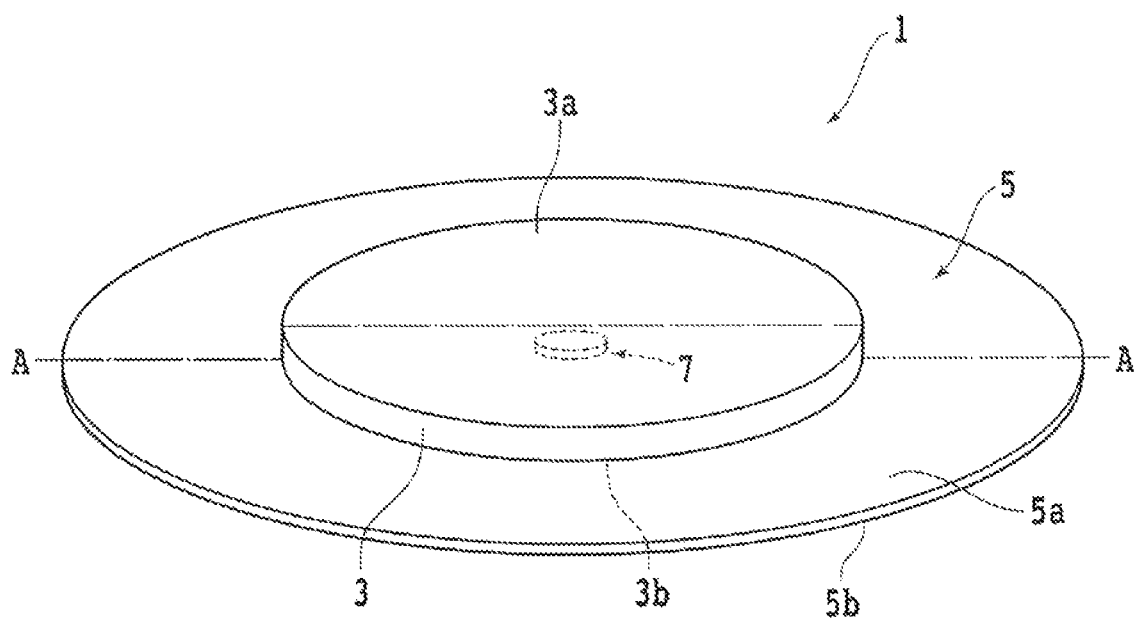
FIG. 1 is a perspective view of a dressing tool.

Embodiments according to one mode of the present invention will be described referring to the attached drawings. FIG. 1 is a perspective view of a dressing tool 1. The dressing tool 1 has, for example, a dressing section 3 formed in a disk shape. However, the shape of the dressing section 3 is not limited to the disk shape. The dressing section 3 has a predetermined diameter, for example, 8 inches (approximately 20 cm) or 12 inches (approximately 30 cm). In addition, a thickness from a front surface 3a of the dressing section 3 to a back surface 3b located on a side opposite to the front surface 3a is, for example, 1 mm.

The dressing section 3 is formed, for example, by using a mixed material in which abrasive grains of white alundum (WA), green carbon (GC) or the like are mixed in a binder such as vitrified or resinoid. It is to be noted, however, that the binder and the abrasive grains constituting the dressing section 3 are changed, as required, according to the configuration of the grindstone or the like. A front surface 5a of a support plate 5 for supporting the dressing section 3 is adhered to the back surface 3b of the dressing section 3. The support plate 5 is formed in a disk shape and is disposed such that a center of the front surface 5a of the support plate 5 coincides substantially with a center of the back surface 3b of the dressing section 3. In other words, the support plate 5 is disposed such that the front surface 5a of the support plate 5 is concentric with the back surface 3b of the dressing section 3.

The support plate 5 has a diameter larger than that of the dressing section 3, such that the support plate 5 can support the whole part of the dressing section 3 and can cover a holding surface 28a (see FIG. 3) of a chuck table 28. In addition, a thickness from the front surface 5a to a back surface 5b of the support plate 5 is approximately 1 mm to 2 mm. The support plate 5 is formed of a resin such as acrylic resin and vinyl chloride resin or a composite material such as glass fiber reinforced polyethylene phthalate. When the support plate 5 absorbs water, the support plate 5 is warped, and, therefore, the material of the support plate 5 is preferably a material having a low water absorption rate.

The water absorption rate is defined, for example, by use of a loss on drying method defined in K 0068 of the Japanese Industrial Standards (JIS) revised in 2001. The water absorption rate of acrylic resin is, for example, 0.3%, the water absorption rate of glass fiber reinforced polyethylene phthalate is, for example, 0.1%, and the water absorption rate of vinyl chloride resin is, for example, 0.02%. Therefore, of the above-mentioned three examples, the glass fiber reinforced polyethylene phthalate is preferable, and the vinyl chloride resin is more preferable, as the material of the support plate 5. With warp of the support plate 5 reduced, it becomes easy to convey the dressing tool 1 by a conveying arm or the like, and it becomes easy to hold under suction the dressing tool 1 on the chuck table 28.

One of or both the support plate 5 and the dressing section 3 is provided with a recess 7 including a disk-shaped space. In FIG. 1, the recess 7 is indicated by a broken line. An RFID tag 9 is provided in the recess 7. The RFID tag 9 may be called an RF tag, integrated circuit (IC) tag, electronic tag, radio tag, or radio IC tag. The RFID tag 9 includes, for example, a control circuit (not illustrated) including an IC and a memory section or the like and an antenna (not illustrated), and has a thickness of approximately 50 µm.

Information concerning the dressing tool 1 is stored in the memory section of the RFID tag 9. Examples of the information concerning the dressing tool 1 to be stored in the RFID tag 9 include the product kind or product lot number of the dressing tool 1, the thickness of the dressing section 3, the number of times of use (for example, five times) of the dressing tool 1, and the expiration date for use (for example, one year) of the dressing tool 1. Note that the product kind and the product lot number serve as information for specifying the grindstones for which the dressing tool 1 is to be used. The information concerning the dressing tool 1 is read by a reading apparatus (reader) (not illustrated) disposed in the vicinity of the RFID tag 9. In addition, information is written into the memory section by a writing apparatus (writer) (not illustrated) disposed in the vicinity of the RFID tag 9.

The RFID tag 9 in this example is of the passive type operated by induction coupling with the reader and the writer, or electromagnetic wave from the reader and the writer, or the like. The RFID tag 9 is not limited to the passive type one and may be of an active type operated by electric power from an incorporated battery. The RFID tag 9 is fixed by a non-conductive material such as a resin 11 provided in the recess 7 (see FIG. 2A and the like). The resin 11 is, for example, a ultraviolet (UV)-curing resin, which is cured by irradiation with UV rays, after the recess 7 is filled with the UV-curing resin in a state in which the RFID tag 9 is disposed in the recess 7. Note that the resin 11 may be a light-curing resin which is cured by visible light or the like other than the UV rays, or may be a thermosetting resin which is cured by heat. In addition, the resin 11 may be a naturally curable type resin which is cured by mixing of a main agent and a curing agent.

Figure 2A:
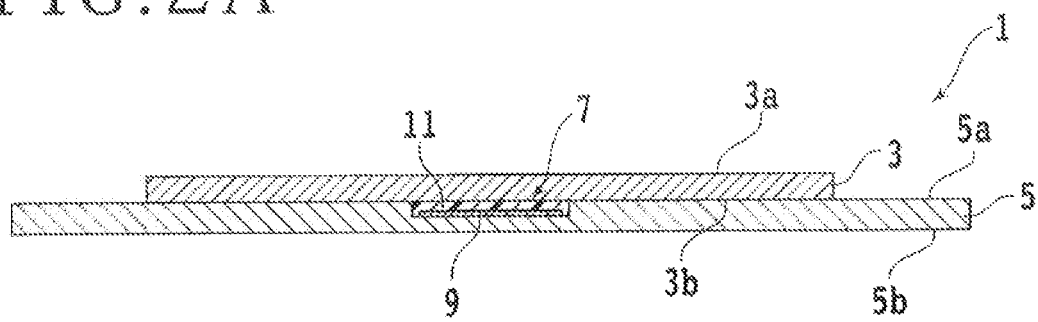
FIG. 2A is an A-A sectional view of a dressing tool according to a first embodiment.

Next, the sectional shape of the dressing tool 1 will be described below referring to FIGS. 2A to 2D. FIGS. 2A to 2D are all sectional views taken along line A-A (see FIG. 1) passing through the center of the front surface 3a of the dressing section 3. FIG. 2A is an A-A sectional view of a dressing tool 1 according to a first embodiment. In the dressing tool 1 of the first embodiment, the recess 7 is formed only in the support plate 5 and not in the dressing section 3, and the RFID tag 9 is provided at a bottom portion of the recess 7.

The resin 11 is provided in the recess 7 such as to cover the RFID tag 9. The dressing section 3 is provided on the front surface 5a of the support plate 5 such as to close the recess 7, and the back surface 3b of the dressing section 3 is fixed to the front surface 5a of the support plate 5 by an adhesive or the like. Since the RFID tag 9 is fixed in the recess 7, peeling off of the RFID tag 9 from the recess 7 would not occur during transportation or use, unlike in the case where the RFID tag 9 is adhered to the front surface 5a of the support plate 5.

Figure 2B:
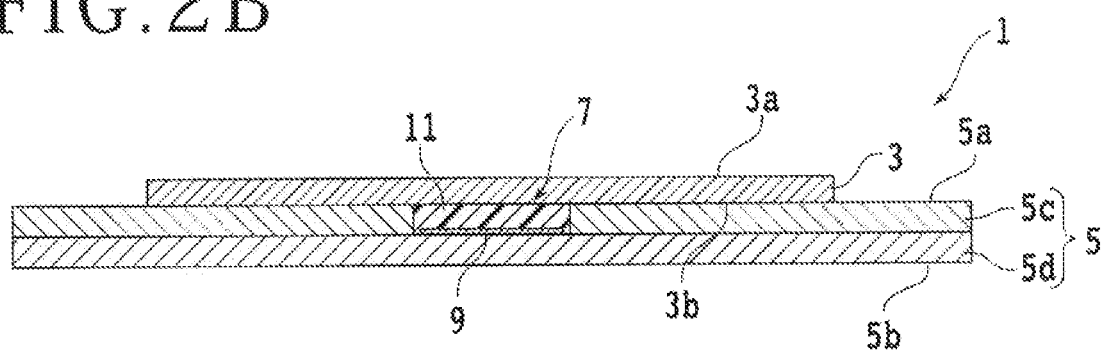
FIG. 2B is an A-A sectional view of a dressing tool according to a second embodiment.

Now, a dressing tool 1 according to a second embodiment will be described below. FIG. 2B is an A-A sectional view of the dressing tool 1 according to the second embodiment. Similarly, in the dressing tool 1 of the second embodiment, the recess 7 is formed only in the support plate 5 and not in the dressing section 3. It is to be noted, however, that the support plate 5 according to the second embodiment includes a first support plate 5c and a second support plate 5d which are substantially the same in diameter and thickness. Particularly, in the second embodiment, the second support plate 5d is provided such as to close one end of a through-hole in the support plate 5c, whereby the recess 7 is formed in the support plate 5.

Similarly, in the second embodiment, the RFID tag 9 is disposed at a bottom portion of the recess 7, and the resin 11 is disposed such as to cover the RFID tag 9. As in the first embodiment, the dressing section 3 is provided on the front surface 5a of the support plate 5 such as to close the recess 7. Incidentally, when dressing of grindstones is conducted by use of the dressing tool 1, the dressing section 3 is worn and the thickness is reduced. However, in the dressing tools 1 according to the first and second embodiments, the RFID tag 9 is not exposed even when the dressing tool 1 is used until the dressing section 3 is worn out completely. Therefore, the RFID tag 9 can be prevented from being damaged by being ground by the grindstones.

Figure 2C:
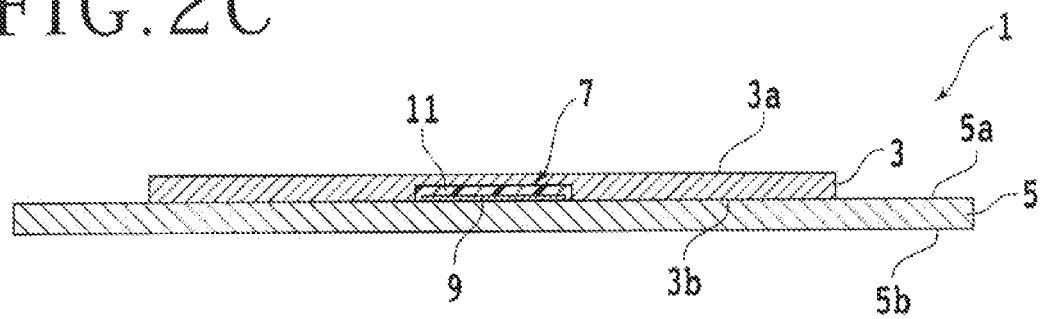
FIG. 2C is an A-A sectional view of a dressing tool according to a third embodiment.

Next, a dressing tool 1 according to a third embodiment will be described below. FIG. 2C is an A-A sectional view of the dressing tool 1 of the third embodiment. In the dressing tool 1 according to the third embodiment, the recess 7 is formed only on the back surface 3b side of the dressing section 3. The RFID tag 9 is fixed not to a bottom portion side of the recess 7 (i.e., on the front surface 3a side of the dressing section 3) but to an opening side of the recess 7 (i.e., on the back surface 3b side of the dressing section 3). However, the RFID tag 9 may be fixed to the bottom portion side of the recess 7, insofar as the dressing tool 1 is used in such a manner that the recess 7 is not exposed.

Figure 2D:
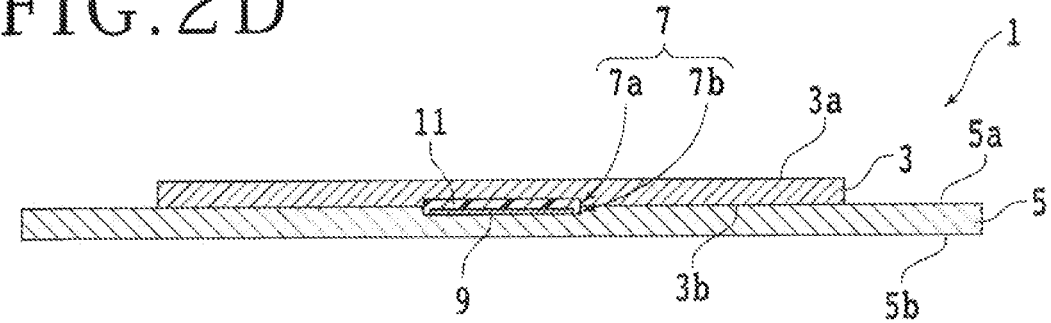
FIG. 2D is an A-A sectional view of a dressing tool according to a fourth embodiment.

Now, a dressing tool 1 according to a fourth embodiment will be described below. FIG. 2D is an A-A sectional view of the dressing tool 1 of the fourth embodiment. In the dressing tool 1 according to the fourth embodiment, a first recess 7a is formed on the back surface 3b side of the dressing section 3, and a second recess 7b is formed on the front surface 5a side of the support plate 5. The first recess 7a and the second recess 7b are disk-shaped spaces having the same diameter, and the first recess 7a and the second recess 7b constitute one recess 7. Note that the shape, structure, layout and the like of the recess 7 are not limited to those in the above embodiments, and may be changed, as required, insofar as the recess 7 can accommodate the RFID tag 9.

Figure 3:
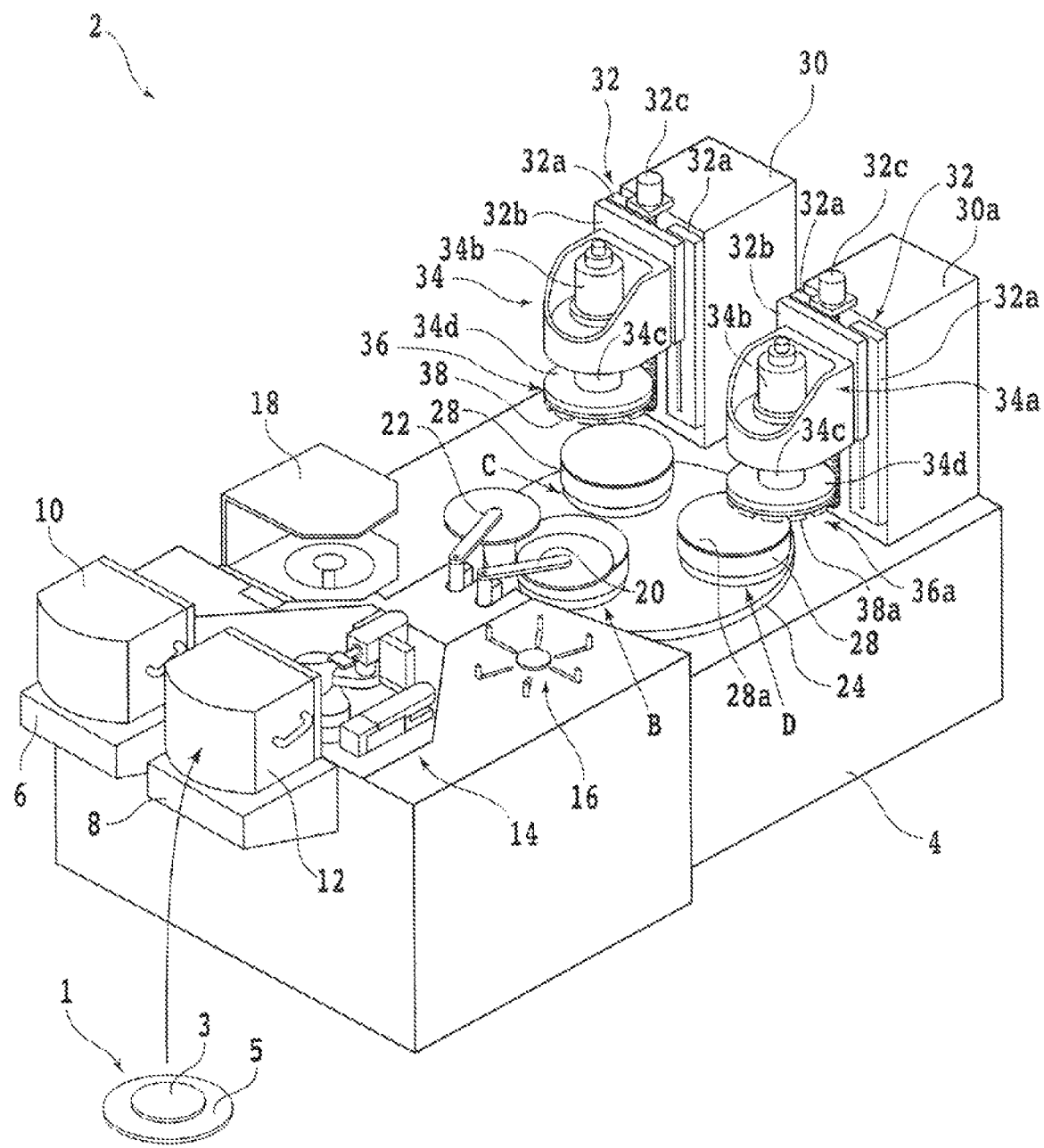
FIG. 3 is a perspective view of a grinding apparatus.

Next, a method of dressing grindstones by use of the dressing tool 1 by a grinding apparatus will be described below. First, the grinding apparatus will be described. FIG. 3 is a perspective view of a grinding apparatus 2. The grinding apparatus 2 is an apparatus for grinding a plate-shaped workpiece such as a semiconductor wafer. The grinding apparatus 2 has a substantially rectangular parallelepiped base 4 for supporting or accommodating components. A cassette mounting base 6 and a cassette mounting base 8 are fixed at a front end of the base 4. For example, a cassette 10 for accommodating the workpieces having been ground is mounted on the cassette mounting base 6, whereas a cassette 12 for accommodating the workpieces yet to be ground is mounted on the cassette mounting base 8.

It is to be noted, however, that the cassette 12 accommodating the dressing tool 1 for dressing the grindstones is mounted on the cassette mounting base 8 in this example. A conveying robot 14 is provided in a region, adjacent to the cassette mounting base 6 and the cassette mounting base 8, of the base 4. The conveying robot 14 conveys out the dressing tool 1 from the cassette 12 and conveys in the dressing tool 1 into the cassette 10. A hand section and an arm section of the conveying robot 14 are provided with a reader/writer (not illustrated) for reading information from the RFID tag 9 and writing information into the RFID tag 9.

The reader/writer performs radio communication with the RFID tag 9 by using a frequency of 13.56 MHz, for example. It is to be noted, however, that the frequency used for the radio communication is not limited to 13.56 MHz. For the radio communication between the reader/writer and the RFID tag 9, a predetermined frequency in a short wave range (3 MHz to 30 MHz) may be used. Note that, in the reader/writer, the functions of a reader and a writer are realized by a single apparatus, a reader and a writer as individually independent apparatuses may be provided in place of the reader/writer.

A positioning table 16 having a plurality of positioning pins is provided on a right rear side of the conveying robot 14. The positioning table 16 moves the plurality of positioning pins in a predetermined direction, to thereby adjust the position of the dressing tool 1 conveyed out of the conveying robot 14. A spinner cleaning apparatus 18 is provided on a left rear side of the conveying robot 14. A loading arm 20 and an unloading arm 22 are provided on a rear side of a region between the positioning table 16 and the spinner cleaning apparatus 18. The loading arm 20 conveys the dressing tool 1 from the positioning table 16 to the chuck table 28 mentioned later.

A disk-shaped turntable 24 is provided on a rear end side of the base 4 relative to the loading arm 20 and the unloading arm 22. A drive mechanism (not illustrated) such as a motor is provided on a lower side of the turntable 24, and the turntable 24 can be rotated both clockwise and counterclockwise. A plurality of chuck tables 28 is provided on the turntable 24. For example, on an upper surface of the turntable 24, three chuck table 28 are provided in the state of being spaced by 120 degrees in a circumferential direction of the turntable 24.

With the turntable 24 rotated, each of the chuck tables 28 is individually positioned in a conveying-in/out region B to which the loading arm 20 and the unloading arm 22 are accessible, a first grinding region C, and a second grinding region D. Each chuck table 28 is substantially disk-shaped and has a frame body on an upper surface side thereof. A flow path (not illustrated) is provided in the frame body, and one end of the flow path is connected to a suction source (not illustrated) such as an ejector.

The frame body has a recess including a disk-shaped space on an upper surface side thereof, and a substantially disk-shaped porous plate is fixed in the recess. The other end of the flow path of the frame body is connected to the porous plate. When the suction source is operated, a negative pressure is generated on the upper surface of the porous plate, so that the upper surface of the chuck table 28 functions as a holding surface 28a for holding under suction the dressing tool 1. To a lower surface side of the chuck table 28, a disk-shaped table base is connected. A drive mechanism (not illustrated) such as a motor is connected to a lower surface side of the table base. When the drive mechanism is operated, the chuck table 28 rotates with a predetermined straight line as a rotational axis.

A column 30 and a column 30a which are rectangular parallelepiped in shape are provided at a rear portion of the base 4. The column 30 and the column 30a are each provided with a grinding feeding unit 32. The grinding feeding unit 32 has a pair of guide rails 32a parallel to a height direction of the column 30. Each guide rail 32a is fixed to a front surface of the column 30. A moving plate 32b is slidably attached to each guide rail 32a. A nut section (not illustrated) is provided on a rear surface side of the moving plate 32b.

A ball screw (not illustrated) disposed in parallel to the height direction of the column 30 is rotatably coupled to the nut section. A pulse motor 32c is connected to one end of the ball screw. With the ball screw rotated by the pulse motor 32c, the moving plate 32b is moved along the guide rails 32a. A first grinding unit 34 is provided on a front surface side of the moving plate 32b on the column 30 side, and a second grinding unit 34a is provided on a front surface side of the moving plate 32b on the column 30a side. In this example, the first grinding unit 34 is a rough grinding unit, and the second grinding unit 34a is a finish grinding unit.

The first grinding unit 34 and the second grinding unit 34a each have a spindle housing 34b. A cylindrical spindle 34c is rotatably provided inside the spindle housing 34b. One end of a spindle motor (not illustrated) is connected to one end of the spindle 34c, and an upper surface side of a disk-shaped wheel mount 34d is fixed to the other end of the spindle 34c. An upper surface side of an annular first grinding wheel 36 is mounted to a lower surface side of the wheel mount 34d of the first grinding unit 34. The first grinding wheel 36 has an annular wheel base mounted to the wheel mount 34d and a plurality of first grindstones 38 mounted to a lower surface side of the wheel base. The plurality of first grindstones 38 is each segment-shaped and is arrayed in an annular pattern on a lower surface side of the wheel base.

An upper surface side of the second grinding wheel 36a is mounted to a lower surface side of the wheel mount 34d of the second grinding unit 34a. The second grinding wheel 36a also includes an annular wheel base mounted to the wheel mount 34d and a plurality of second grindstones 38a mounted to a lower surface side of the wheel base. The plurality of second grindstones 38a is also each segment-shaped and is arrayed in an annular pattern on a lower surface side of the wheel base. In this example, the first grindstones 38 are rough grindstone, and the second grindstones 38a are finish grindstones smaller in abrasive grains than the rough grindstones. Therefore, the region directly under the first grinding unit 34 corresponds to the aforementioned first grinding region C, and the region directly under the second grinding unit 34a corresponds to the aforementioned second grinding region D.

The dressing tool 1 used in the first grinding region C or the second grinding region D is conveyed from the chuck table 28 to the spinner cleaning apparatus 18 by the unloading arm 22. Then, the dressing tool 1 is conveyed from the spinner cleaning apparatus 18 to the cassette 12 by the conveying robot 14. The grinding apparatus 2 has a control section (not illustrated) for controlling operations of the conveying robot 14, the positioning table 16, the loading arm 20, the unloading arm 22, the turntable 24, the chuck table 28, the pulse motor 32c, the reader/writer and the like. The control section includes a computer which includes a processing apparatus such as a central processing unit (CPU) and a storage apparatus such as flash memory. By operating the processing apparatus according to a software such as a program stored in the storage apparatus, the control section functions as specific means in which a software and a processing apparatus (hardware resource) cooperate with each other.

Next, an example of a step of dressing the first grindstones 38 by use of the aforementioned dressing tool 1 will be described below. Note that, in this example, the conveying robot 14 is provided with the reader/writer. First, the cassette 12 in which the dressing tools 1 are accommodated is mounted on the cassette mounting base 8 (cassette mounting step (S10)) by the operator, for example. Next, the conveying robot 14 makes access to the cassette 12 and comes close to one dressing tool 1 from the cassette 12. Then, using the RFID tag 9 and the reader/writer, it is examined whether or not the one dressing tool 1 is a tool for the first grindstones 38 (examination step (S20)).

In the case where it is determined in the examination step (S20) that the one dressing tool 1 is not the tool for the first grindstones 38, the conveying robot 14 comes close to another dressing tool 1 in the cassette 12. Until the dressing tool 1 for the first grindstones 38 is detected, the approaching to another dressing tool 1 and reading of the RFID tag 9 are repeated. Since the grinding apparatus 2 has the reader/writer capable of reading information from the RFID tag 9, it can be recognized for dressing of which grindstones the dressing tool 1 is suitable. In addition, in this example, since the dressing tool 1 suitable for the grindstones to be dressed can be detected at the stage of access of the conveying robot 14 to the cassette 12, conveying of the dressing tool 1 unsuitable for the grindstones to be dressed onto the turntable 24 is prevented.

On the other hand, in the case where it is determined in the examination step (S20) that the one dressing tool 1 is the tool for the first grindstones 38, the conveying robot 14 places the dressing tool 1 on the positioning table 16. Thereafter, the dressing tool 1 is conveyed from the positioning table 16 onto the turntable 24 by the loading arm 20 and is held by the chuck table 28 located in the conveying-in/out region B (holding step (S30)).

Note that, in this instance, the back surface 5b side of the support plate 5 is held by the holding surface 28a such that the front surface 3a of the dressing section 3 of the dressing tool 1 is exposed on the upper side. After the holding step (S30), the turntable 24 is rotated to move the chuck table 28 holding the dressing tool 1 thereon into the first grinding region C (moving step (S40)). Then, the chuck table 28 is rotated, for example, at 40 rpm, and the first grinding wheel 36 is rotated in the same direction as the chuck table 28 at, for example, 2,000 rpm. In addition, grinding water such as pure water is supplied to the first grindstone 38.

In this state, from a position of approximately 100 µm above the front surface 3a of the dressing section 3, the first grinding unit 34 is subjected to grinding feeding at a predetermined speed (for example, 5 µm/s) in a direction for approaching the holding surface 28a, by use of the grinding feeding unit 32 (dressing step (S50)). In the dressing step (S50), the front surface 3a side of the dressing section 3 makes contact with the first grindstones 38, whereby the first grindstones 38 are dressed. As a result, the first grindstones 38 are set. For example, in the dressing step (S50), the front surface 3a side of the dressing section 3 is worn by 100 µm, and a bottom portion side of the first grindstones 38 is worn by 100 µm.

After the dressing step (S50), the rotation of the chuck table 28 and the first grinding wheel 36 is stopped. Then, the turntable 24 is rotated, and the chuck table 28 holding the dressing tool 1 thereon is returned into the conveying-in/out region B. Thereafter, for example, the dressing tool 1 is conveyed out to the cassette 12 by use of the unloading arm 22, the conveying robot 14 and the like (conveying-out step (S60)). In the conveying-out step (S60), information that the dressing tool 1 has been used is written into the RFID tag 9 by the reader/writer of the conveying robot 14. As a result, information concerning the dressing tool 1 is updated, so that the useful life of the dressing tool 1 (i.e., whether or not the expiration date for use has come) and the like can be grasped accurately, as compared to the case of an RFID tag 9 in which information cannot be written.

The configurations, methods and the like concerning the above embodiments may be modified, as required, insofar as the modifications do not depart from the scope of the object of the present invention. In the case of dressing the second grindstones 38*a*, a dressing tool 1 for the second grindstones 38*a* which is comparatively small in abrasive grains as compared to the dressing tool 1 for the first grindstones 38 is used. Note that, in the case where the conveying robot 14 is not provided with the reader/writer, the reader/writer is provided on the positioning table 16. The reader/writer is provided, for example, on a non-movable circular base of the positioning table 16 or in the vicinity of a groove section in which a positioning pin is moved. In the case where the reader/writer is provided on the positioning table 16, the examination step (S20) is conducted when the dressing tool 1 is placed on the positioning table 16.

In addition, in the case where neither the conveying robot 14 nor the positioning table 16 is provided with the reader/writer, the reader/writer is provided, for example, on the loading arm 20. The reader/writer is provided, for example, at a hand section or an arm section of the loading arm 20. In the case where the reader/writer is provided on the loading arm 20, the examination step (S20) is performed when the dressing tool 1 is held by the loading arm 20. Incidentally, the dressing tool 1 used in the first grinding region C or the second grinding region D may be conveyed out to the positioning table 16, not by the unloading arm 22 but by the loading arm 20. In this case, the dressing tool 1 is conveyed from the positioning table 16 to the cassette 12 by the conveying robot 14.

The present invention is not limited to the details of the above described preferred embodiments. The scope of the invention is defined by the appended claim and all changes and modifications as fall within the equivalence of the scope of the claim are therefore to be embraced by the invention.

What is claimed is:

1. A dressing tool to be used in dressing a plurality of grindstones arrayed in an annular pattern on one surface side of a grinding wheel, the dressing tool comprising:
   a dressing section for dressing the plurality of grindstones, wherein the dressing section is formed of abrasive grains mixed with a binder, and is configured and arranged for dressing the grindstones of the grinding wheel;
   a support plate that is located on a side opposite to a front surface side of the dressing section making contact with the plurality of grindstones and that supports a back surface side of the dressing section; and
   a radio frequency identifier tag from which information concerning the dressing tool is read and written by a reader, wherein the information includes product information about the dressing tool that enables determination of the suitability of the dressing tool in conjunction with a particular grinding wheel,
   wherein one of or both the support plate and the dressing section are provided with a recess, and the radio frequency identifier tag is disposed in the recess and is fixed by a non-conductive material provided in the recess.

2. A method of using a dressing tool for dressing a plurality of grindstones arrayed in an annular pattern on one surface side of a grinding wheel, the dressing tool including a dressing section for dressing the plurality of grindstones, a support plate that is located on a side opposite to a front surface side of the dressing section, a radio frequency identifier tag from which information concerning the dressing tool is read and written by a reader, wherein one of or both the support plate and the dressing section are provided with a recess, and the radio frequency identifier tag is disposed in the recess and is fixed by a non-conductive material provided in the recess, wherein the method comprises:
   using the reader to read the radio frequency identifier tag disposed within the recess in the dressing tool;
   determining whether or not the dressing tool is appropriate for use in dressing the plurality of grindstones based on the information read from the radio frequency identifier tag disposed within the recess in the dressing tool; and
   if it has been determined during the determining step that the dressing tool is appropriate for use in dressing the plurality of grindstones, a step of dressing of the plurality of grindstones with the dressing tool is performed.

3. The method of using a dressing tool for dressing a plurality of grindstones according to claim 2, wherein:
   if it has been determined during the determining step that the dressing tool is not appropriate for use in dressing the plurality of grindstones, the reader is used to read a second radio frequency identifier tag disposed within a second recess in a second dressing tool and a second determining step of determining whether or not the second dressing tool is appropriate for use in dressing the plurality of grindstones based on the information read from the radio frequency identifier tag disposed within the second recess in the second dressing tool; and
   if it has been determined during the second determining step that the second dressing tool is appropriate for use in dressing the plurality of grindstones, a step of dressing of the plurality of grindstones with the second dressing tool is performed.

* * * * *